W. C. HEDGCOCK.
ADJUSTABLE BRAKE HEAD.
APPLICATION FILED NOV. 28, 1914.
1,140,035.
Patented May 18, 1915.
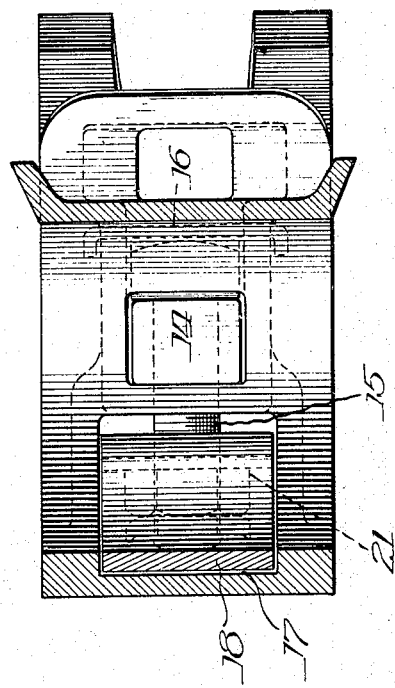
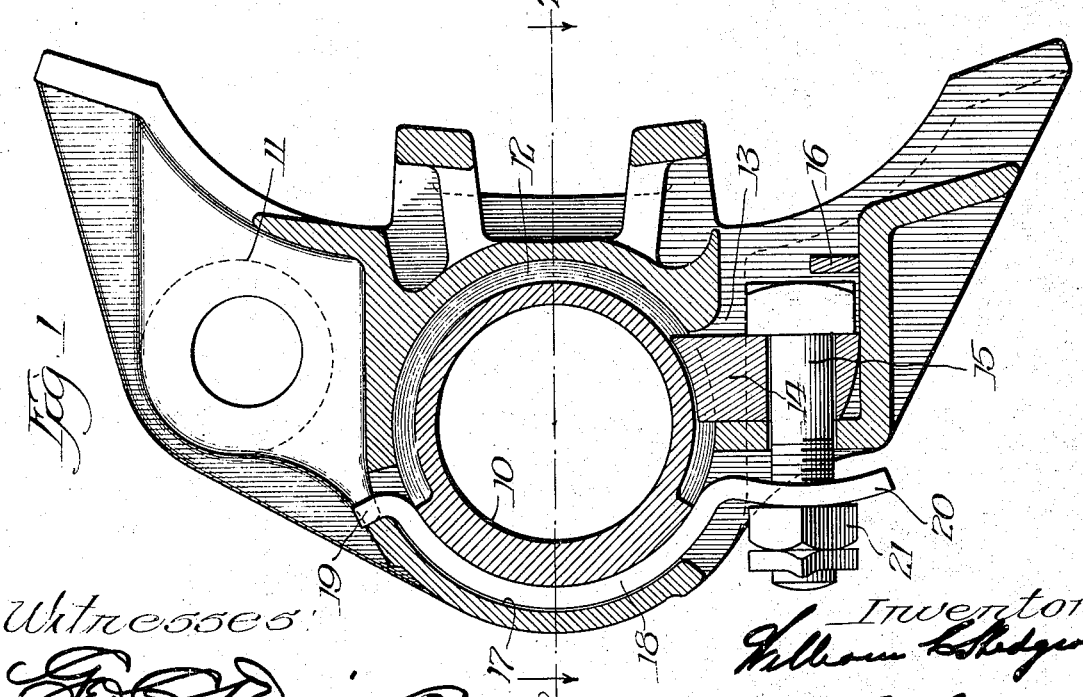

UNITED STATES PATENT OFFICE.

WILLIAM C. HEDGCOCK, OF CHICAGO, ILLINOIS, ASSIGNOR TO AMERICAN STEEL FOUNDRIES, OF NEW YORK, N. Y., A CORPORATION OF NEW JERSEY.

ADJUSTABLE BRAKE-HEAD.

1,140,035.  Specification of Letters Patent.  Patented May 18, 1915.

Application filed November 28, 1914. Serial No. 874,508.

*To all whom it may concern:*

Be it known that I, WILLIAM C. HEDGCOCK, a citizen of the United States, and resident of Chicago, in the county of Cook and State of Illinois, have invented certain new and useful Improvements in Adjustable Brake-Heads, of which the following is a specification.

My invention relates to brakes and has particular reference to a novel brake head mounted for angular adjustment on the end of a beam or bar.

It is common practice to employ a type of brake head which may be angularly adjusted and maintained in such position. A desirable function of such a locking device is that the locking force shall be applied in a direction substantially parallel to the horizontal axis of the head. Preferably the arrangement is such that the locking force tends to maintain the bearing surface and the head in close engagement on the face side of the head. Thus for the reason that the force in braking is transmitted through the brake shoe, the brake head, and to the beam at that point, and inasmuch as the slightest deflection at that point detracts from the value of the beam as a whole, this point is an important one.

Furthermore, it is an object of this invention to provide a simple locking device which shall include in combination therewith means for maintaining the head on the beam against lateral displacement. Such results are secured in the present head.

The invention will be more readily understood by reference to the accompanying drawings wherein:

Figure 1 is a transverse vertical section through a brake head constructed in accordance with my invention; Fig. 2 is a section on the line 2—2 of Fig. 1, the sleeve or bearing member being removed.

Referring more particularly to the drawings it will be seen that the sleeve or bearing member 10, adapted to be secured to or integral with a brake beam, carries a brake head 11. The bearing is provided with an incomplete peripheral groove 12. Located in a recess 13 in the lower portion of the head is a block 14, the upper end of which is seated within the groove 12. The block is adapted to be inserted through an opening in the face of the head and be held in the proper position by means of a bolt 15. A transverse key 16 passed through the head, prevents the accidental displacement of the block or holding bolt. Mounted in a groove 17 in the back of the head is a leaf spring 18, the upper end 19 of which is in the form of the hook engaging the rear wall of the head. The lower portion 20 of the spring lies in the plane of, and is apertured to receive the bolt 15. A nut 21 on the bolt, when actuated serves to exert force on the spring and to force the same against the surface of the sleeve 10. It will be seen that the force tending to hold the head in angularly adjusted position is directed in a line substantially parallel to the horizontal axis of the head, and that inasmuch as the braking force is applied to the face of the head, thence to the sleeve and the beam, that the locking device will maintain the contacting surfaces of the sleeve and head in constant engagement and thus eliminate possible deflection at that point. Furthermore, the holding means being resilient, a constant and sure locking engagement is assured. The same bolt which locks the head also maintains the block 14 in place and prevents the removal of the head from the beam.

Obviously certain modifications may be made in the construction shown, and such modifications as are within the scope of my claims I consider within the spirit of my invention.

I claim:

1. In a device of the class described, the combination of a head having a central aperture and provided with recesses communicating therewith, a block held in one recess, a spring mounted in another recess, and a single means for actuating and holding both said block and said spring, substantially as described.

2. In a device of the class described, the combination of a bearing having a groove, a head mounted on said bearing, said head being provided with recesses, a block mounted in one recess and having a portion projecting into the groove in said bearing, a spring mounted in another recess, and a bolt engaging both said block and said spring, substantially as described.

3. In a device of the class described, the combination of a bearing having a peripheral groove, a head, a block carried by said head, said block engaging said bearing in said groove and preventing the removal of said head, a leaf spring located in the back of the head and having an extended contact with the periphery of said bearing, and a single bolt for maintaining said block in position and for exerting tightening force on said spring, substantially as described.

4. In a device of the class described, the combination of a bearing having a peripheral groove, a head on said bearing, said head having a recess, a block mounted in said recess and adapted to project into the groove in said bearing, said head having an internal groove, a leaf spring mounted in said head and exerting its force in a substantially horizontal line passing through the axis of the bearing, and a bolt for holding said block and exerting force on said spring, substantially as described.

WILLIAM C. HEDGCOCK.

Witnesses:
J. F. LYNN,
CHARLES R. ROE.